US008630634B2

(12) United States Patent  (10) Patent No.: US 8,630,634 B2
Chmaytelli et al.  (45) Date of Patent: *Jan. 14, 2014

(54) PROCESSING OF INTERACTIVE SCREENS FOR A WIRELESS DEVICE

(75) Inventors: Mazen Chmaytelli, San Diego, CA (US); Brian Minear, San Diego, CA (US); Mitchell B. Oliver, San Diego, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/057,139

(22) Filed: Mar. 27, 2008

(65) Prior Publication Data

US 2008/0182569 A1  Jul. 31, 2008

Related U.S. Application Data

(63) Continuation of application No. 11/209,490, filed on Aug. 23, 2005, now abandoned, which is a continuation of application No. 10/232,917, filed on Aug. 30, 2002, now Pat. No. 7,039,398.

(51) Int. Cl.
*H04M 3/00* (2006.01)

(52) U.S. Cl.
USPC ..... 455/419; 455/418; 455/412.1; 455/414.1; 455/450; 455/557; 709/206; 709/219; 709/217; 709/238; 379/201.04; 379/201.05

(58) Field of Classification Search
USPC ........ 455/419, 418, 556, 412.1, 414.1, 556.1, 455/557; 709/206
See application file for complete search history.

(56) References Cited

U.S. PATENT DOCUMENTS

| 5,572,643 | A | | 11/1996 | Judson |
| 5,594,779 | A | * | 1/1997 | Goodman ................. 455/3.04 |
| 5,721,827 | A | | 2/1998 | Logan et al. |
| 5,732,216 | A | | 3/1998 | Logan et al. |
| 5,737,619 | A | | 4/1998 | Judson |
| 5,738,583 | A | | 4/1998 | Comas et al. |
| 5,740,549 | A | | 4/1998 | Reilly et al. |
| 5,809,415 | A | | 9/1998 | Rossman |

(Continued)

FOREIGN PATENT DOCUMENTS

| CA | 2267549 | 9/2000 |
| CA | 2381025 | 2/2001 |

(Continued)

OTHER PUBLICATIONS

Supplementary European Search Report—EP 03749190, European Patent Office—The Hague—Mar. 28, 2006.

(Continued)

*Primary Examiner* — Marceau Milord
(74) *Attorney, Agent, or Firm* — Fariba Yadegar-Bandari

(57) ABSTRACT

A method for processing interactive screens for a wireless device is provided. The method includes receiving, from the wireless device, a download request for content. The method further includes determining whether the wireless device has an interactive screen associated with the content. If it is determined that the wireless device has the interactive screen associated with the content, the method further includes transmitting the content to the wireless device without transmitting the interactive screen.

24 Claims, 5 Drawing Sheets

(56) References Cited

U.S. PATENT DOCUMENTS

| | | | |
|---|---|---|---|
| 5,822,324 | A | 10/1998 | Kostreti et al. |
| 5,848,396 | A | 12/1998 | Gerace |
| 5,852,775 | A | 12/1998 | Hidary |
| 5,930,701 | A | 7/1999 | Skog |
| 5,933,811 | A | 8/1999 | Angles et al. |
| 5,937,347 | A | 8/1999 | Gordon |
| 5,966,663 | A | 10/1999 | Gleason |
| 5,983,117 | A | 11/1999 | Sandler et al. |
| 6,009,410 | A | 12/1999 | Lemole et al. |
| 6,018,710 | A | 1/2000 | Wynblatt et al. |
| 6,032,039 | A | 2/2000 | Kaplan |
| 6,047,051 | A | 4/2000 | Ginzboorg et al. |
| 6,067,570 | A | 5/2000 | Kreynin et al. |
| 6,072,946 | A | 6/2000 | Dooley et al. |
| 6,097,962 | A | 8/2000 | Corriveau et al. |
| 6,098,102 | A | 8/2000 | Nielsen et al. |
| 6,167,253 | A | 12/2000 | Farris et al. |
| 6,167,255 | A | 12/2000 | Kennedy, III et al. |
| 6,185,586 | B1 | 2/2001 | Judson |
| 6,185,682 | B1 | 2/2001 | Tang |
| 6,237,022 | B1 | 5/2001 | Bruck et al. |
| 6,275,496 | B1 | 8/2001 | Burns et al. |
| 6,282,435 | B1 | 8/2001 | Wagner et al. |
| 6,298,373 | B1 | 10/2001 | Burns et al. |
| 6,311,056 | B1 | 10/2001 | Sandidge |
| 6,317,780 | B1 | 11/2001 | Cohn et al. |
| 6,317,791 | B1 | 11/2001 | Cohn et al. |
| 6,324,182 | B1 | 11/2001 | Burns et al. |
| 6,332,127 | B1 | 12/2001 | Bandera et al. |
| 6,335,101 | B1 | 1/2002 | Haeger et al. |
| 6,336,101 | B1 | 1/2002 | Dean et al. |
| 6,338,094 | B1 | 1/2002 | Scott et al. |
| 6,356,543 | B2 | 3/2002 | Hall et al. |
| 6,363,258 | B1 | 3/2002 | Schmidt et al. |
| 6,363,419 | B1 | 3/2002 | Martin, Jr. et al. |
| 6,366,947 | B1 | 4/2002 | Kavner |
| 6,378,069 | B1 | 4/2002 | Sandler et al. |
| 6,389,278 | B1 | 5/2002 | Singh |
| 6,401,113 | B2 | 6/2002 | Lazaridis et al. |
| 6,405,037 | B1 * | 6/2002 | Rossmann ............... 455/426.1 |
| 6,405,309 | B1 | 6/2002 | Cheng et al. |
| 6,430,409 | B1 | 8/2002 | Rossman |
| 6,438,585 | B2 | 8/2002 | Mousseau et al. |
| 6,463,463 | B1 | 10/2002 | Godfrey et al. |
| 6,463,464 | B1 | 10/2002 | Lazaridis et al. |
| 6,473,609 | B1 * | 10/2002 | Schwartz et al. ............. 455/406 |
| 6,477,150 | B1 | 11/2002 | Maggenti et al. |
| 6,477,565 | B1 | 11/2002 | Daswani et al. |
| 6,493,751 | B1 * | 12/2002 | Tate et al. .................. 709/221 |
| 6,496,775 | B2 | 12/2002 | McDonald, Jr. et al. |
| 6,505,201 | B1 | 1/2003 | Haitsuka et al. |
| 6,507,727 | B1 * | 1/2003 | Henrick ..................... 455/3.06 |
| 6,546,002 | B1 | 4/2003 | Kim |
| 6,567,854 | B1 | 5/2003 | Olshansky et al. |
| 6,571,281 | B1 | 5/2003 | Nickerson |
| 6,571,290 | B2 | 5/2003 | Selgas et al. |
| 6,578,142 | B1 | 6/2003 | Anderson et al. |
| 6,580,914 | B1 | 6/2003 | Smith |
| 6,587,127 | B1 | 7/2003 | Leeke et al. |
| 6,587,684 | B1 | 7/2003 | Hsu et al. |
| 6,591,288 | B1 | 7/2003 | Edwards et al. |
| 6,603,844 | B1 | 8/2003 | Chavez et al. |
| 6,615,186 | B1 * | 9/2003 | Kolls ........................ 705/26 |
| 6,622,174 | B1 | 9/2003 | Ukita et al. |
| 6,625,578 | B2 | 9/2003 | Spaur et al. |
| 6,650,901 | B1 | 11/2003 | Schuster et al. |
| 6,654,615 | B1 | 11/2003 | Chow et al. |
| 6,658,455 | B1 | 12/2003 | Weinman, Jr. |
| 6,680,935 | B1 | 1/2004 | Kung et al. |
| 6,708,203 | B1 | 3/2004 | Makar et al. |
| 6,708,205 | B2 | 3/2004 | Sheldon et al. |
| 6,715,043 | B1 | 3/2004 | Stevens |
| 6,721,578 | B2 * | 4/2004 | Minear et al. ................ 455/566 |
| 6,763,226 | B1 | 7/2004 | McZeal, Jr. |
| 6,769,010 | B1 | 7/2004 | Knapp et al. |
| 6,771,290 | B1 | 8/2004 | Hoyle |
| 6,790,142 | B2 | 9/2004 | Okada et al. |
| 6,856,820 | B1 * | 2/2005 | Kolls ........................ 455/575.9 |
| 6,862,445 | B1 | 3/2005 | Cohen |
| 6,868,155 | B1 | 3/2005 | Cannon et al. |
| 6,871,218 | B2 | 3/2005 | Desai et al. |
| 6,874,029 | B2 | 3/2005 | Hutcheson et al. |
| 6,882,850 | B2 | 4/2005 | McConnell et al. |
| 6,892,226 | B1 | 5/2005 | Tso et al. |
| 6,914,891 | B2 | 7/2005 | Ha et al. |
| 6,947,705 | B2 | 9/2005 | Tsuchiuchi |
| 6,947,772 | B2 | 9/2005 | Minear et al. |
| 6,957,076 | B2 | 10/2005 | Hunzinger |
| 6,970,443 | B2 | 11/2005 | Dynarski et al. |
| 6,985,934 | B1 | 1/2006 | Armstrong et al. |
| 6,990,534 | B2 * | 1/2006 | Mikhailov et al. ............ 709/250 |
| 6,996,394 | B2 | 2/2006 | Minear et al. |
| 6,996,537 | B2 | 2/2006 | Minear et al. |
| 6,999,431 | B2 | 2/2006 | Rines |
| 7,003,289 | B1 * | 2/2006 | Kolls ........................ 455/422.1 |
| 7,008,317 | B2 | 3/2006 | Cote et al. |
| 7,016,334 | B2 | 3/2006 | Cohen et al. |
| 7,020,690 | B1 | 3/2006 | Haitsuka et al. |
| 7,027,801 | B1 | 4/2006 | Hall et al. |
| 7,039,164 | B1 | 5/2006 | Howe |
| 7,039,398 | B2 * | 5/2006 | Chmaytelli et al. .......... 455/419 |
| 7,046,689 | B2 | 5/2006 | Burns et al. |
| 7,046,956 | B1 | 5/2006 | Cohen |
| 7,062,543 | B2 | 6/2006 | Kishimoto |
| 7,065,342 | B1 | 6/2006 | Rolf |
| 7,065,388 | B2 * | 6/2006 | Minear et al. ................ 455/566 |
| 7,076,244 | B2 | 7/2006 | Lazaridis et al. |
| 7,103,048 | B1 | 9/2006 | Nozawa |
| 7,103,368 | B2 | 9/2006 | Teshima |
| 7,103,671 | B2 | 9/2006 | Quiggle et al. |
| 7,113,776 | B2 | 9/2006 | Minear et al. |
| 7,136,915 | B2 | 11/2006 | Rieger, III |
| 7,136,920 | B2 | 11/2006 | Castell et al. |
| 7,139,551 | B2 | 11/2006 | Jamadagni |
| 7,142,812 | B1 | 11/2006 | Brankovic et al. |
| 7,155,508 | B2 | 12/2006 | Sankuratripati et al. |
| 7,155,681 | B2 | 12/2006 | Mansour et al. |
| 7,174,305 | B2 | 2/2007 | Carruthers et al. |
| 7,181,415 | B2 | 2/2007 | Blaser et al. |
| 7,197,277 | B2 | 3/2007 | Davies et al. |
| 7,200,142 | B1 | 4/2007 | Loghmani |
| 7,218,918 | B1 | 5/2007 | Alston |
| 7,236,774 | B2 | 6/2007 | Lee |
| 7,248,861 | B2 | 7/2007 | Lazaridis et al. |
| 7,251,476 | B2 | 7/2007 | Cortegiano |
| 7,251,478 | B2 | 7/2007 | Cortegiano |
| 7,266,371 | B1 | 9/2007 | Amin et al. |
| 7,272,385 | B2 | 9/2007 | Mirouze et al. |
| 7,283,805 | B2 | 10/2007 | Agrawal |
| 7,284,066 | B1 | 10/2007 | Philyaw et al. |
| 7,292,870 | B2 | 11/2007 | Heredia et al. |
| 7,321,920 | B2 * | 1/2008 | Washburn ................... 709/206 |
| 7,359,720 | B2 | 4/2008 | Hartmaier et al. |
| 7,376,696 | B2 * | 5/2008 | Bell et al. .................... 709/203 |
| 7,389,271 | B2 | 6/2008 | Arai |
| 7,403,905 | B2 | 7/2008 | Shioda et al. |
| 7,409,203 | B2 | 8/2008 | Zabawskyj et al. |
| 7,411,546 | B2 | 8/2008 | Pitt et al. |
| 7,424,293 | B2 | 9/2008 | Zhu |
| 7,426,380 | B2 | 9/2008 | Hines et al. |
| 7,426,532 | B2 * | 9/2008 | Bell et al. .................... 709/201 |
| 7,471,236 | B1 | 12/2008 | Pitt et al. |
| 7,478,056 | B1 | 1/2009 | Lu |
| 7,489,273 | B2 | 2/2009 | Pitt et al. |
| 7,490,135 | B2 | 2/2009 | Klug et al. |
| 7,516,196 | B1 * | 4/2009 | Madan et al. ................ 709/219 |
| 7,516,213 | B2 | 4/2009 | Cunningham et al. |
| 7,548,611 | B2 | 6/2009 | Howe |
| 7,551,919 | B2 | 6/2009 | Cortegiano |
| 7,558,559 | B2 | 7/2009 | Alston |
| 7,558,884 | B2 | 7/2009 | Fuller et al. |
| 7,577,771 | B2 | 8/2009 | Steeb et al. |
| 7,626,951 | B2 | 12/2009 | Croy et al. |
| 7,629,926 | B2 | 12/2009 | Pitt et al. |

(56) References Cited

U.S. PATENT DOCUMENTS

| | | | |
|---|---|---|---|
| 7,660,914 B2 | 2/2010 | Perez et al. |
| 7,668,144 B2 | 2/2010 | Taylor et al. |
| 7,672,879 B1 | 3/2010 | Kumar et al. |
| 7,688,211 B2 | 3/2010 | Borovoy et al. |
| 7,688,811 B2 | 3/2010 | Kubler et al. |
| 7,724,878 B2 | 5/2010 | Timmins et al. |
| 7,756,485 B2 | 7/2010 | Paas et al. |
| 7,764,219 B2 | 7/2010 | Pitt et al. |
| 7,782,254 B2 | 8/2010 | Pitt et al. |
| 7,805,132 B2 | 9/2010 | Zabawskyj et al. |
| 7,810,723 B2 | 10/2010 | Boardman et al. |
| 7,814,148 B2 | 10/2010 | Bell et al. |
| 7,825,780 B2 | 11/2010 | Pitt et al. |
| 7,844,491 B1 | 11/2010 | Haitsuka et al. |
| 7,849,131 B2 | 12/2010 | Van De Sluis |
| 7,870,592 B2 | 1/2011 | Hudson et al. |
| 7,890,102 B2 | 2/2011 | Zhu |
| 7,894,825 B2 | 2/2011 | Wallace et al. |
| 7,899,450 B2 | 3/2011 | Pitt et al. |
| 7,904,503 B2 | 3/2011 | Van De Sluis |
| 7,904,516 B2 | 3/2011 | Chern |
| 7,907,551 B2 | 3/2011 | Croy et al. |
| 7,912,446 B2 | 3/2011 | Zhu et al. |
| 7,929,530 B2 | 4/2011 | Marshall et al. |
| 7,965,222 B2 | 6/2011 | Pitt et al. |
| 7,966,013 B2 | 6/2011 | D'souza et al. |
| 8,005,434 B2 | 8/2011 | Paas et al. |
| 8,027,695 B2 | 9/2011 | Zabawskyj et al. |
| 8,032,112 B2 | 10/2011 | Hines et al. |
| 8,032,119 B2 | 10/2011 | Alston |
| 8,059,789 B2 | 11/2011 | Hines et al. |
| 8,068,587 B2 | 11/2011 | Geldenbott et al. |
| 8,081,817 B2 | 12/2011 | Tedesco et al. |
| 8,082,552 B2 | 12/2011 | Agrawal |
| 8,089,401 B2 | 1/2012 | Pitt et al. |
| 8,117,037 B2 | 2/2012 | Gazdzinski |
| 8,126,458 B2 | 2/2012 | Zhu |
| 8,126,889 B2 | 2/2012 | Pitt |
| 8,135,620 B2 | 3/2012 | Barsade et al. |
| 8,150,363 B2 | 4/2012 | Dickinson et al. |
| 8,150,911 B2 | 4/2012 | Bell et al. |
| 8,160,504 B2 | 4/2012 | Paas et al. |
| 8,185,087 B2 | 5/2012 | Mitchell, Jr. et al. |
| 8,188,936 B2 | 5/2012 | Fuller et al. |
| 8,190,151 B2 | 5/2012 | D'souza et al. |
| 8,200,819 B2 | 6/2012 | Chung et al. |
| 8,208,605 B2 | 6/2012 | Geldenbott et al. |
| 8,219,153 B2 | 7/2012 | Gil et al. |
| 8,229,458 B2 | 7/2012 | Busch |
| 8,315,599 B2 | 11/2012 | Kasad et al. |
| 8,336,664 B2 | 12/2012 | Wallace et al. |
| 8,364,171 B2 | 1/2013 | Busch |
| 8,369,825 B2 | 2/2013 | Dickinson et al. |
| 8,369,967 B2 | 2/2013 | Hoffberg et al. |
| 8,380,134 B2 | 2/2013 | Paas et al. |
| 8,385,881 B2 | 2/2013 | Zhu et al. |
| 8,385,964 B2 | 2/2013 | Haney |
| 8,406,728 B2 | 3/2013 | Dickinson et al. |
| 8,437,776 B2 | 5/2013 | Busch |
| 8,447,331 B2 | 5/2013 | Busch |
| 2001/0013020 A1 | 8/2001 | Yoshida et al. |
| 2001/0048676 A1 | 12/2001 | Jimenez et al. |
| 2002/0002047 A1 | 1/2002 | Fujiwara |
| 2002/0002605 A1 | 1/2002 | Honda |
| 2002/0004855 A1 | 1/2002 | Cox et al. |
| 2002/0006124 A1 | 1/2002 | Jimenez et al. |
| 2002/0010740 A1 | 1/2002 | Kikuchi et al. |
| 2002/0019831 A1 | 2/2002 | Wade |
| 2002/0032019 A1 | 3/2002 | Marks et al. |
| 2002/0036655 A1 | 3/2002 | Yulevich et al. |
| 2002/0046299 A1 | 4/2002 | Lefeber et al. |
| 2002/0072355 A1 | 6/2002 | Jeong et al. |
| 2002/0087335 A1 | 7/2002 | Meyers et al. |
| 2002/0090985 A1 | 7/2002 | Tochner et al. |
| 2002/0095456 A1 | 7/2002 | Wensheng |
| 2002/0107027 A1 | 8/2002 | O'neil |
| 2002/0107737 A1 | 8/2002 | Kaneko et al. |
| 2002/0115449 A1 | 8/2002 | Allen |
| 2002/0123336 A1 | 9/2002 | Kamada |
| 2002/0128029 A1 | 9/2002 | Nishikawa et al. |
| 2002/0154558 A1 | 10/2002 | Urata et al. |
| 2002/0159387 A1 | 10/2002 | Allison et al. |
| 2002/0160752 A1 | 10/2002 | Hook et al. |
| 2002/0161637 A1 | 10/2002 | Sugaya |
| 2002/0165773 A1 | 11/2002 | Natsuno et al. |
| 2002/0188838 A1 | 12/2002 | Welder |
| 2002/0193094 A1 | 12/2002 | Lawless et al. |
| 2002/0194414 A1 | 12/2002 | Bateman et al. |
| 2002/0194592 A1 | 12/2002 | Tsuchida et al. |
| 2002/0194593 A1 | 12/2002 | Tsuchida et al. |
| 2003/0006911 A1 | 1/2003 | Smith et al. |
| 2003/0007627 A1 | 1/2003 | Elsey et al. |
| 2003/0017826 A1 | 1/2003 | Fishman et al. |
| 2003/0041125 A1* | 2/2003 | Salomon ............. 709/220 |
| 2003/0050837 A1 | 3/2003 | Kim |
| 2003/0054833 A1 | 3/2003 | Hayduk |
| 2003/0055735 A1 | 3/2003 | Cameron et al. |
| 2003/0055872 A1 | 3/2003 | Meidan et al. |
| 2003/0065802 A1* | 4/2003 | Vitikainen et al. ........ 709/231 |
| 2003/0067903 A1 | 4/2003 | Jorgensen |
| 2003/0097350 A1 | 5/2003 | Shamrao |
| 2003/0114106 A1 | 6/2003 | Miyatsu et al. |
| 2003/0114157 A1 | 6/2003 | Spitz et al. |
| 2003/0143991 A1 | 7/2003 | Minear |
| 2003/0163369 A1 | 8/2003 | Arr |
| 2003/0172044 A1 | 9/2003 | Shamrao |
| 2003/0191729 A1 | 10/2003 | Siak et al. |
| 2003/0206194 A1 | 11/2003 | Boyd |
| 2004/0203681 A1 | 10/2004 | Ross |
| 2004/0204063 A1 | 10/2004 | Van Erlach |
| 2005/0120242 A1 | 6/2005 | Mayer et al. |
| 2005/0215238 A1 | 9/2005 | Macaluso |
| 2005/0270570 A1 | 12/2005 | Fujitani et al. |
| 2005/0278230 A1 | 12/2005 | Shirasaka et al. |
| 2005/0282535 A1 | 12/2005 | Chmaytelli et al. |
| 2006/0141993 A1 | 6/2006 | Minear et al. |
| 2006/0190330 A1 | 8/2006 | Tollinger et al. |
| 2006/0287040 A1 | 12/2006 | Walker et al. |
| 2007/0042760 A1 | 2/2007 | Roth |
| 2007/0054672 A1 | 3/2007 | Onishi et al. |
| 2007/0060117 A1 | 3/2007 | Fishman et al. |
| 2007/0066365 A1 | 3/2007 | Minear et al. |
| 2008/0090613 A1 | 4/2008 | Dowling |
| 2008/0155017 A1 | 6/2008 | Minear et al. |
| 2008/0225815 A1 | 9/2008 | Minear et al. |
| 2008/0288478 A1 | 11/2008 | Klug et al. |
| 2009/0011740 A1 | 1/2009 | Aggarwal et al. |
| 2010/0174756 A1 | 7/2010 | Lazaridis et al. |
| 2011/0185411 A1 | 7/2011 | Selgas et al. |

FOREIGN PATENT DOCUMENTS

| | | |
|---|---|---|
| CA | 2199757 | 5/2003 |
| CL | 1301-1993 | 1/1995 |
| CL | 1621-1997 | 7/1998 |
| CL | 1437-1999 | 12/1999 |
| CL | 1787-2001 | 7/2002 |
| CN | 1300146 | 6/2001 |
| CN | 1364016 | 8/2002 |
| EP | 1122929 A1 | 8/2001 |
| EP | 1143679 | 10/2001 |
| EP | 1162805 | 7/2009 |
| JP | 113072 | 1/1999 |
| JP | 1168987 | 3/1999 |
| JP | 11-187470 | 7/1999 |
| JP | 2000163367 | 6/2000 |
| JP | 2000222331 A | 8/2000 |
| JP | 2001134531 | 5/2001 |
| JP | 2001202437 A | 7/2001 |
| JP | 2001209611 A | 8/2001 |
| JP | 2001216440 | 8/2001 |
| JP | 2001256151 | 9/2001 |
| JP | 2001-306923 | 11/2001 |
| JP | 2001306434 | 11/2001 |

(56) References Cited

FOREIGN PATENT DOCUMENTS

| | | |
|---|---|---|
| JP | 2001312666 A | 11/2001 |
| JP | 2002-014890 | 1/2002 |
| JP | 2002014919 | 1/2002 |
| JP | 2002032402 A | 1/2002 |
| JP | 2002044733 | 2/2002 |
| JP | 2002133170 A | 5/2002 |
| JP | 2002163542 A | 6/2002 |
| JP | 2005516323 | 6/2005 |
| JP | 4563684 | 8/2010 |
| KR | 2001-0106325 | 11/2001 |
| KR | 20010103907 | 11/2001 |
| KR | 1020010106356 | 11/2001 |
| KR | 20020006374 A | 1/2002 |
| KR | 2002-0025472 | 4/2002 |
| KR | 100703368 | 4/2007 |
| RU | 2073913 | 2/1997 |
| RU | 2112325 | 5/1998 |
| RU | 2127951 | 3/1999 |
| RU | 10929 | 8/1999 |
| RU | 2178628 | 1/2002 |
| TW | 364242 | 7/1999 |
| TW | 457825 | 10/2001 |
| WO | 9739548 | 10/1997 |
| WO | 9750062 A1 | 12/1997 |
| WO | WO9802793 | 1/1998 |
| WO | 9831172 | 7/1998 |
| WO | WO9909486 A1 | 2/1999 |
| WO | 9943136 | 8/1999 |
| WO | 9956207 A1 | 11/1999 |
| WO | 0049793 | 8/2000 |
| WO | WO0062564 | 10/2000 |
| WO | 0078010 | 12/2000 |
| WO | WO0078005 | 12/2000 |
| WO | WO0101225 | 1/2001 |
| WO | WO01054284 | 7/2001 |
| WO | WO0160014 | 8/2001 |
| WO | WO0161913 A2 | 8/2001 |
| WO | 0184868 | 11/2001 |
| WO | 0203199 | 1/2002 |
| WO | WO0221506 A1 | 3/2002 |
| WO | 02079981 | 10/2002 |
| WO | 03/065596 | 8/2003 |
| WO | 03065743 | 8/2003 |

OTHER PUBLICATIONS

International Search Report—PCT/US03/027015—International Search Authority—United States—Jul. 16, 2004.

International Preliminary Examination Report, PCT/US2003/027015, International Preliminary Examining Authority/US-Alexandria, Virginia-Sep. 16, 2004.

De Jong et al., "A VoD Application Implemented in Java", Multimedia Tools and Applications, 5, 161-170 (1997) Kluwer Academic Publishers, Manufactured in The Netherlands.

U.S. Appl. No. 90/008,816, "Request for Ex-Parte Reexamination of U.S. Patent No. 7,065,388", Oct. 17, 2007.

U.S. Appl. No. 90/008,816, "Request for Ex-Parte Reexamination of U.S. Patent No. 7,065,388 Granted", Nov. 23, 2007.

U.S. Appl. No. 90/008,816, "Office Action", Sep. 4, 2008.

U.S. Appl. No. 90/008,816, "Applicant Arguments/Remarks made in an amendment", Nov. 4, 2008.

U.S. Appl. No. 90/008,816, "Applicant Arguments/Remarks made in an amendment", Jan. 22, 2009.

U.S. Appl. No. 90/008,816, "Office Action", Jun. 23, 2009.

U.S. Appl. No. 90/008,816, "Office Action", Aug. 24, 2009.

U.S. Appl. No. 10/689,969, "Office Action", Oct. 20, 2003.

U.S. Appl. No. 10/689,969, "Applicant Arguments/Remarks made in an Amendment", Oct. 20, 2003.

U.S. Appl. No. 10/689,969, "Office Action", Aug. 11, 2005.

U.S. Appl. No. 10/689,969, "Applicant Arguments/Remarks made in an Amendment", Nov. 14, 2005.

U.S. Appl. No. 10/689,969, "Office Action", Jan. 24, 2006.

Stefan Funfrocken, Enabling Technologies: Infrastructure for Collaborative Enterprises., Proceedings Sixth IEEE workshops on "How to Integrate Mobile Agents into Web Servers," Jun. 18-20, 1997, pp. 97-99.

U.S Appl. No. 12/057,139, "Applicant Arguments/Remarks made in an amendment", Jan. 6, 2009.

U.S Appl. No. 12/057,139, "Office Action", Apr. 30, 2009.

U.S Appl. No. 12/057,139, "Office Action", Oct. 6, 2008.

\* cited by examiner

PROCESSING OF INTERACTIVE SCREENS FOR A WIRELESS DEVICE

CROSS-REFERENCE TO RELATED APPLICATIONS

The subject application is a continuation of, and claims priority from U.S. patent application Ser. No. 11/209,490, filed on Aug. 23, 2005, and entitled "Processing of Interactive Screens for a Wireless Device," which is a continuation of, and claims priority from U.S. patent application Ser. No. 10/232,917, filed on Aug. 30, 2002, and entitled "Server Processing of Interactive Screens for a Wireless Device," now U.S. Pat. No. 7,039,398, both of which are incorporated herein by reference in their entirety.

BACKGROUND OF THE INVENTION

I. Field of the Invention

The present invention generally relates to wireless networks and computer communications across wireless networks. More particularly, the invention relates to the processing of an interactive screen by one or more servers for display on a wireless device when the wireless device attempts to access or download a software application or data from the one or more servers.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). Some wireless devices, such as select cellular telephones, may have an installed application programming computer platform that allows software developers to create software applications that operate on the wireless device.

On the Internet and other open networks, it is known to provide a user of a computer an interactive form when the user seeks to download or access software applications or data, such as an end-user license agreement (EULA), release, or verification form as to age, location or non-commercial status, prior to letting the user download the application. The user then must interact with the form, which sends a confirming signal back to the application download server, and then the user is given access to the application desired downloaded. However, the Internet and most LAN or WAN networks are wire-based or otherwise have inexpensive data connectivity such that bandwidth is easily available to provide interactivity between the browsing computer and the application download server. Thus, the transmission of the end-user license agreement or other verification forms and return of the confirming data does not take up significant network resources. Conversely, in a wireless network environment such as cellular telecommunications, any network connection for data transfer is expensive and the use of a user-interactive form to traverse the network prior to application download has traditionally been prohibitive.

Consequently, it is desirable to provide an interactive mechanism to a wireless device by which the user of the wireless device must interact prior to accessing data over a network. Such a mechanism needs to account for the limited bandwidth and other characteristics associated with the wireless network.

SUMMARY OF THE INVENTION

In accordance with one embodiment, a method for processing interactive screens for a wireless device is provided. The method includes receiving, from the wireless device, a download request for content. The method further includes determining whether the wireless device has an interactive screen associated with the content. If it is determined that the wireless device has the interactive screen associated with the content, the method further includes transmitting the content to the wireless device without transmitting the interactive screen.

According to another embodiment, a system for supporting a wireless device is provided. The system includes means for receiving, from a wireless device on a wireless network, a download request for content. The system further includes means for determining whether the wireless device has an interactive screen associated with the content. Further included in the system is means for transmitting the interactive screen and the content to the wireless device. If said means for determining determines that the wireless device has the interactive screen, said means for transmitting transmits the content to the wireless device without transmitting the interactive screen.

According to yet another embodiment, a machine readable medium comprising instructions, which when executed by said machine causes said machine to perform operations is provided. The instructions include at least one instruction for receiving, from the wireless device, a download request for content. The instructions further include at least one instruction for determining whether the wireless device has an interactive screen associated with the content. If it is determined that the wireless device has the interactive screen associated with the content, the instructions further include at least one instruction for transmitting the content to the wireless device without transmitting the interactive screen. If it is determined that the wireless device does not have the interactive screen associated with the content, the instructions further include at least one instruction for transmitting the interactive screen prior to the wireless device before transmitting the content associated with the download request.

In still another embodiment of the present invention, a method for processing interactive screens for a wireless device, comprises receiving a request sent across a wireless network to download data to the wireless device and transmitting an interactive screen and destined for the wireless device prior to transmitting data destined for the wireless device. The method may further comprise receiving a signal indicating an interaction of the wireless device and the interactive screen and transmitting the downloaded data requested by the wireless device. Also, receiving the request sent across a wireless network may be received by a first network server and transmitting the interactive screen may be performed by a second network server. This may also may upon receiving a signal indicating an interaction of the wireless device is received by the second network server, wherein upon the second network server sending a signal to the first network server indicating the interaction and the first network server transmitting the downloaded data requested by the wireless device.

In yet another embodiment of the present invention, a system for processing an interactive screen for a wireless device with a first network server and a second network server, comprises the first network server in selective communication with a wireless network and in selective communication with the second network server and the second network server in selective communication with a wireless network and in selective communication with the first network server, wherein the first network server receives a request for download data from the wireless device, communicates the request to the second network server and the second network server transmits an interactive screen to the wireless network destined for the wireless device.

In yet another embodiment of the present invention, a method for processing an interactive screen on the graphic display of a user-interactive wireless devices including a computer platform, the wireless device selectively communicating with a network server and downloading applications and data therefrom, the method comprises attempting to transmit data to the wireless device from the network server across the wireless network, and transmitting a interactive screen to the computer platform of the wireless device across the wireless network prior to downloading the requested data to the wireless device.

Objects, advantages, and features of the present invention will become apparent after review of the hereinafter set forth Brief Description of the Drawings, Detailed Description of the Invention, and the Claims.

DETAILED DESCRIPTION OF THE INVENTION

Introduction

Figure 1:
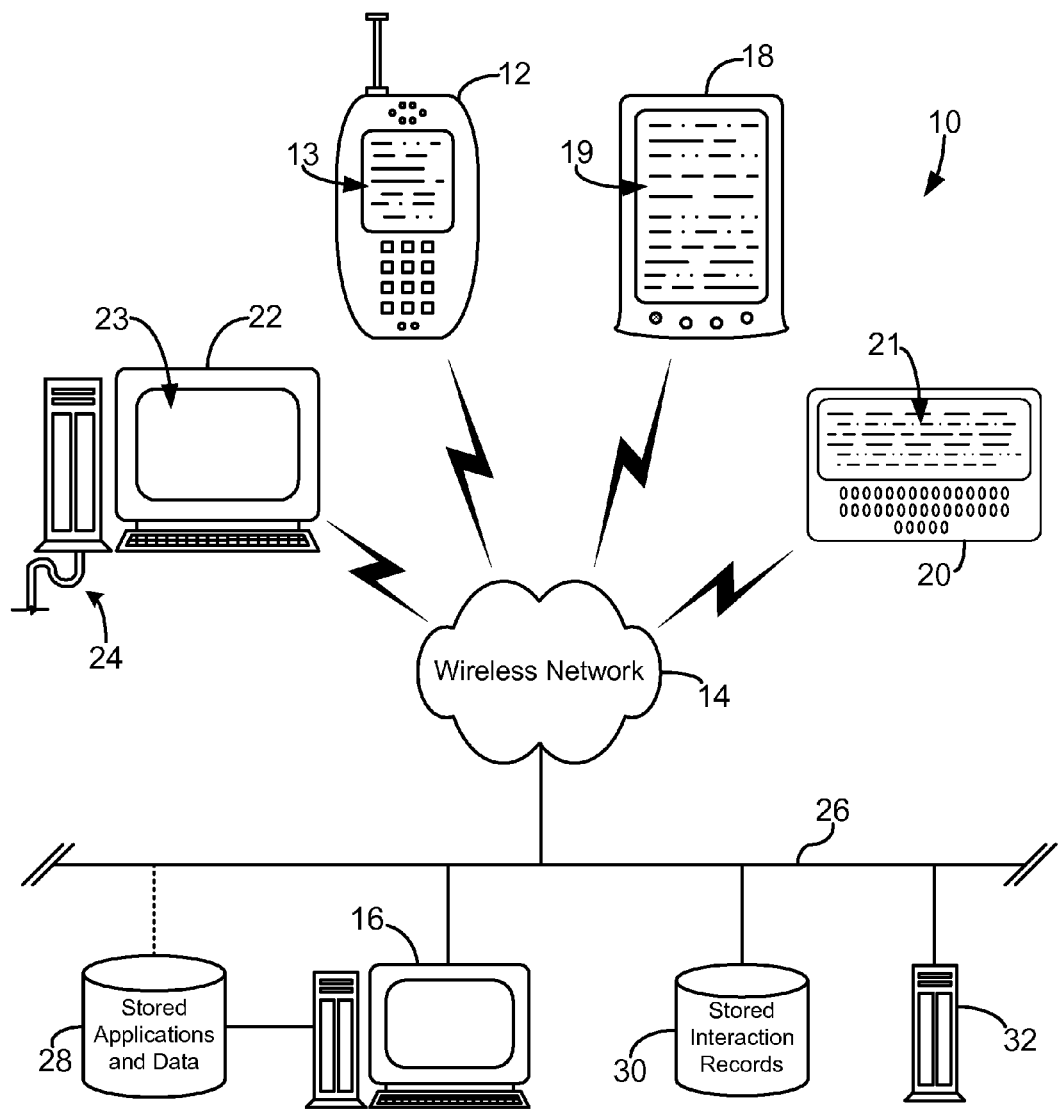
FIG. 1 is a representative diagram of a wireless network and the computer hardware and wireless devices that can be used within the system to provide an interactive screen to the wireless devices.

Systems and methods are anticipated that provide for the downloading of software applications to a wireless device. Software applications can come pre-loaded at the time the wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application using the wireless network, the user will typically either call a service provider or contact the service provider through other means, such as through an Internet access, and the service provider will either transmit the application to the wireless device across the wireless network or allow the user access a network site where the application is downloadable or accessible. To connect to the application download server, the wireless device bridges a communication connection to the wireless network, such as a cellular network, and then attempts to contact an application download server where the desired software application is resident. Once the wireless device contacts the application download server, an initial connection is made and the application download server determines what application are available to the wireless device and sends the appropriate information, such as a menu, for display on the wireless device so the user can learn of the available applications. Once access is provided to the downloadable applications, the user of the wireless device can download any of the available applications.

The present invention provides systems and methods for providing an interactive screen on the graphic display of a wireless device when the wireless device attempts to download or access data or applications on a network server, such as an application download server, across a wireless network. The interactive screen allows the limited access of individual applications and data on the network server. The interactive screen can be transmitted to the wireless device from first network server that the wireless device computer platform is attempting to navigate, or the interactive screen can be transmitted to the wireless device from a second server on the wireless network. The interactive screen can include graphics, text, multimedia components, data entry fields, or hyperlinks, all of which are displayable and interactive on the graphic display of the wireless device, and the system requires the end-user to properly interact with the screen in order to download or access the requested applications or data.

Examples of the interactive screen are EULAs which require the end-user to agree to certain terms before being allowed to download a software application, or a verification form that requires the end-user to input data in order to have the requested access to the applications or data on the network server. Once the user of the wireless device interacts with the interactive screen displayed on the graphic display of the wireless device in the proper predefined manner, the wireless device sends a signal to the first or second network server indicating the proper interaction, and the first network server will then allow the access or download of the requested application or data to the computer platform of the wireless device. When a second network server has provided the interactive screen to the wireless device, the second network server can also receive the interaction data from the wireless device and relay the interaction data to the first network server whereby the first network server then allows the download of the requested data to the computer platform of the wireless device.

It is therefore one object of the present inventive system and method to provide an interactive screen that can be displayed to the user of a wireless device seeking to download or access a specific application and data on a network server, such as an application download server. The interactive screen the operator of the network server the ability to selectively control the access the user of the wireless device has to the network server resident applications, and force users to enter EULAs or input data before being allowed to access the applications and data. With the use of a separate network server that can provide the interactive screen to the wireless device and store the interaction records, the system can conserve bandwidth and resources of the wireless network while controlling access to the applications and data of other network servers. The present invention thus provides an advantage in that it gives an operator of a network server the ability to have wireless device users execute agreements or verify facts prior to granting the user the ability to download or access applications and data resident on the application download or network server without significant use of the bandwidth and resources of the wireless network and network servers.

EXEMPLARY EMBODIMENTS OF THE PRESENT INVENTION

With reference to the figures in which like numerals represent like elements throughout, FIG. 1 illustrates an embodiment of a system 10 for providing subscribed software applications to one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, with a graphics display 13, a personal digital assistant 18 with PDA screen 19, a pager 20 with a graphics display 21, which is shown here as a two-way text pager, or even a separate computer platform 22 that has a wireless communication portal and a display 23, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a database 28 with stored applications and data that contains software applications and data that are accessible and downloadable to the wireless devices 12, 18, 20, and 22. There is also shown a second network server which is an interactive screen server 32 and with stored interaction database 30. In such embodiment, the interactive screen server 32 transmits the interactive screen to the wireless device 12, 18, 20, and 22 as below described, and the stored interaction records database 30, which can be resident on the interactive screen server 32, stores the individual records for the interactions with the wireless devices that the interactive screen was provided to, the data input by the end-user, and any other interaction related data. Through the separate interactive screen server 32 and stored interaction records database 30, many other network servers, such as application download server 16, can have the system 10 provide the interactive screens to control access to network server resident applications and data without significant use of the network server resources. However, interactive screen server 32 and stored interaction record database 30 are not necessary as server-side functions can be performed on one server, such as application download server 16. Further, a computer server-side computer platform can provide separate services and processes to the wireless devices 12, 18, 20, and 22 across the wireless network 14.

Figure 2:
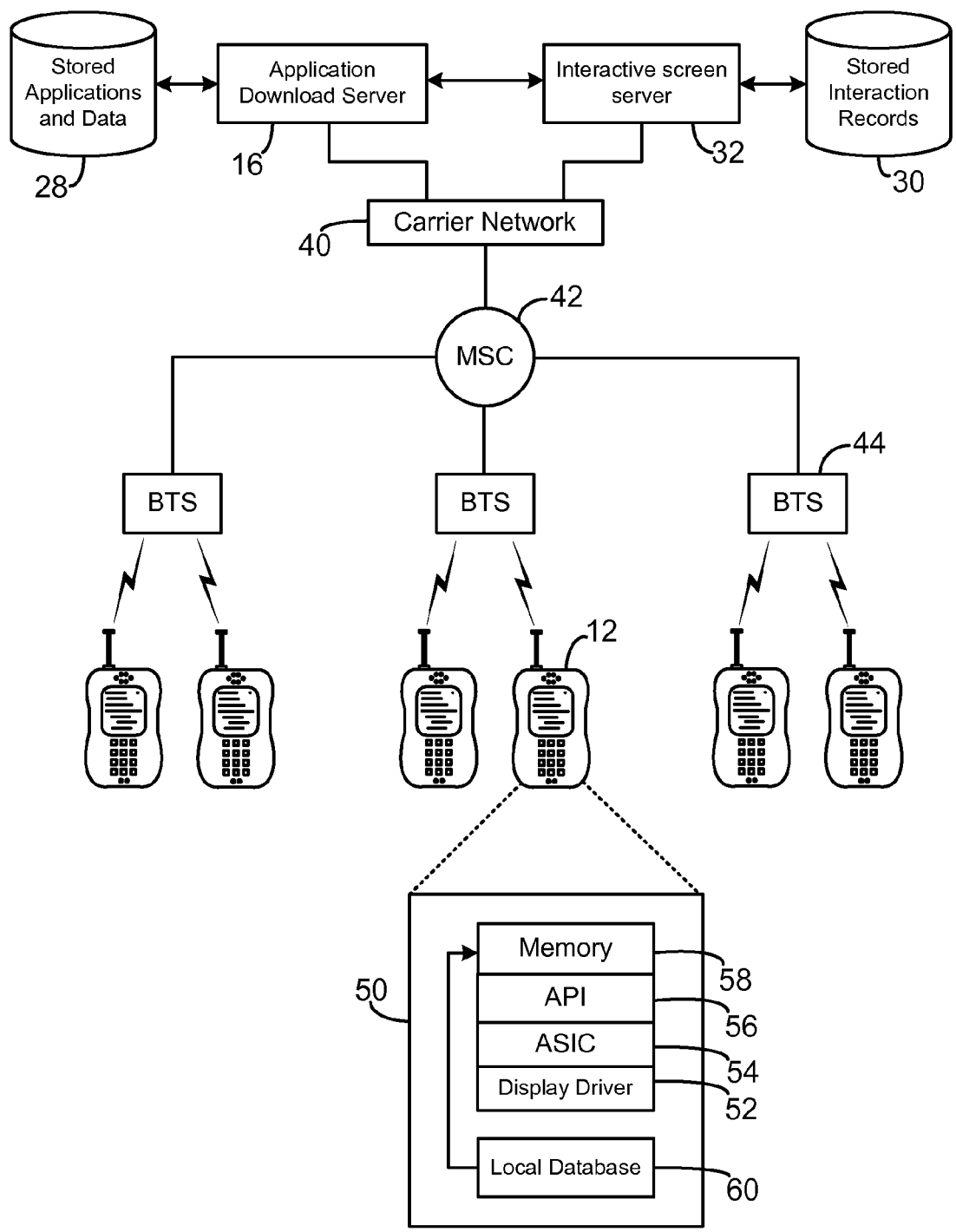
FIG. 2 is a block diagram of the hardware components of the wireless network providing communication between different wireless devices, an application download server, a separate interactive screen server, and their respective databases.

FIG. 2 is a block diagram that more fully illustrates the components of the wireless network 14 and interrelation of the elements of the system 10. The wireless network 14 is merely exemplary and can include any system whereby remote modules, such as wireless devices 12, 18, 20, and 22, communicate over-the-air between and among each other and/or between and among components of a wireless network 14, including, without limitation, wireless network carriers and/or servers, as well as including a non-wireless network alone or in combination with a wireless network. The application download server 16 and the stored applications database 28, interactive screen server 32, and stored interaction records database 30, will be present on the cellular data network with any other components that are needed to provide cellular telecommunication services. The application download server 16, interactive screen server 32, and/or other screen servers communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications and display data transmitted from the application download server 16. The computer platform 50 also allows the wireless device to interact with data and applications resident on network servers. The computer platform 50 may include, among other components, a display driver 52 that drives the graphics display 13 and renders images on the graphics display 13 based upon graphics data received at the computer platform 50. The computer platform 50 also includes an application-specific integrated circuit ("ASIC") 54, or other processor, microprocessor, logic circuit, or other data processing device. The ASIC 52 or other processor executes the application programming interface ("API") layer 56 that interfaces with any resident programs in the memory 58 of the wireless device. The memory can be comprised of read-only or random-access memory (RAM and ROM), EPROM, EEPROM, flash cards, or any memory common to computer platforms. The computer platform 50 also includes a local database 60 that can hold the software applications not actively used in memory 58, such as the software applications downloaded from the application download server 16. The local database 60 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can access and download many types of applications, such as games and stock monitors, or simply data such as news and sports-related data. The downloaded data can be immediately displayed on the display or stored in the local database 60 when not in use. The software applications can be treated as a regular software application resident on the wireless device 12, 18, 20, and 22, and the user of the wireless device can selectively upload stored resident applications from the local database 60 to memory 58 for execution on the API 56. The end-user of the wireless device 12, 18, 20, and 22 can also selectively delete a software application from the local database 60.

Figure 3A:
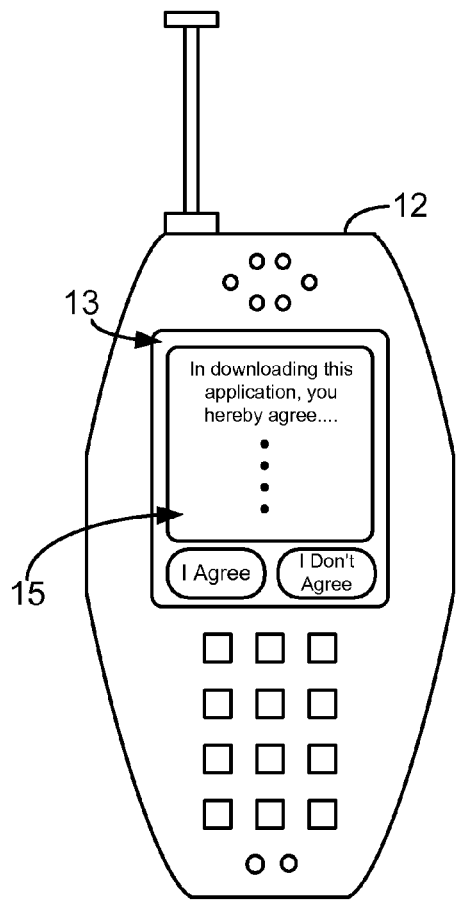
FIG. 3A is a perspective view of the graphic display of a cellular telephone displaying a EULA to the user upon the user seeking to download an application.
Figure 3B:
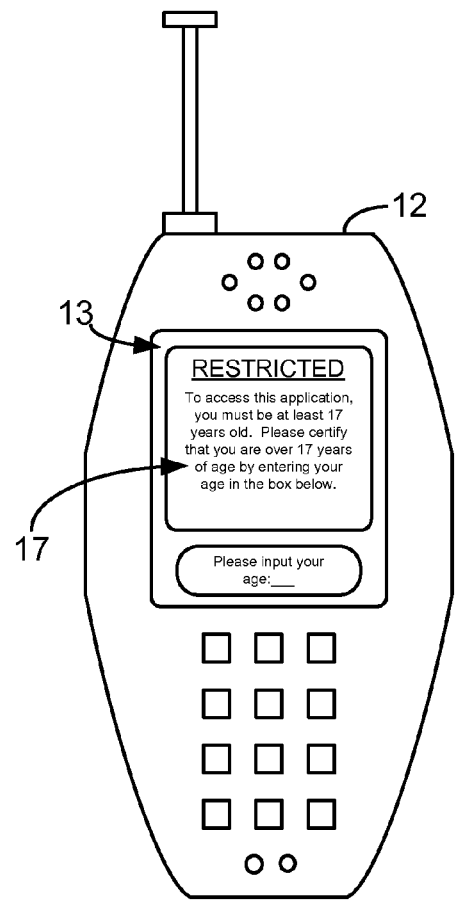
FIG. 3B is a perspective view of the graphic display of a cellular telephone displaying an age-verification to the user upon the end-user seeking to download an age-restricted application, and the user is requested to enter their age on the form.

As shown in FIGS. 3A and 3B, the system 10 displays an interactive screen 15 and 17 on the graphic display 13 of a wireless device, such as cellular telephone 12, upon the wireless device attempting to access or download data from a network server, such as application download server 16 across the wireless network 14. The system 10 transmits an interactive screen to the computer platform 50 of the wireless device, either from the server containing the request application or data or from a second server such as interactive screen server 32. The interactive screen 15 and 17 will appear to the user on the graphic display prior to the network server downloading or allowing access to the requested data or application. The operator of the network server can thus control the access of the wireless device 12, 18, 20, and 22 to individual applications and data through using the interactive screen 15 and 17. As an example, in FIG. 3A, an end-user license agreement (EULA) interactive screen 15 is displayed to the end-user on the graphic display 13 when the user seeks to download a software application from application download server 16. The user must indicate agreement with the EULA in order to download the application, and can interact with the EULA 15 on the API 56 of the computer platform. Typical APIs provide a movable cursor on the display that can activate icons as is well known in the art, and other graphic-user interfaces can be used such as a touch screen and stylus that is common in PDA interfaces. Whatever the end-user inputs in response to the EULA is signaled back to the application download server 16, either directly from the cellular telephone 12 or indirectly from a signal sent by interactive screen server 32 indicating the user interaction.

As another example of an interactive screen, FIG. 3B illustrates an age verification form 17 that requires the user to input their age prior to being granted access to age-restricted material on the network server. The user thus enters his/her age in response the screen and the cellular telephone transmits the input data to an appropriate network server, such as application download server 16 or interactive screen server 32. Some processing can occur either at the server where the data is requested or at the interactive screen server 32 to determine if the input age meets the criteria. If the interactive screen server 32 processes the data, it can transmit an affirmative or negative signal to the requested-data server to authorize the access of the wireless device.

While the interactive screen 15 and 17 can be transmitted to the wireless device 12, 18, 20, and 22 from the network server that the wireless device attempted to access or download data from, one embodiment includes the use of another network server, such as interactive screen server 32 and an associated stored interaction records database 30, to conserve the resources on pure application servers such as application download server 16. Thus, upon a wireless device 12,18,20, 22 attempting to download or access data or an application on a first network server across the wireless network 14, such as application download server 16, the interactive screen is transmitted to the wireless device 12, 18, 20, and 22 from a second network server, such as interactive screen server 32, across the wireless network 14. In such embodiment, once the user of the wireless device 12, 18, 20, and 22 interacts with the interactive screen displayed on the graphic display 13, 19, 21, and 23 of the wireless device 12, 18, 20, and 22, the wireless device sends the signal indicating the interaction to the second network server (interactive screen server 32), and the second network server sends a signal to the first network server (application download server 16) indicating the interaction at the wireless device such that the first network server is now allowed to provide access or download the requested data or application to the computer platform 50 of the wireless device 12, 18, 20, and 22. If the interactive screen requires input of data, such as verification form 17 in FIG. 3B, once the end-user of the wireless device 12, 18, 20, and 22 inputs data on the interactive screen, the wireless device 12, 18, 20, and 22 sends the input data to the second network server (interactive screen server 32), the second network server again sends a signal to the first network server (application download server 32) indicating the input of data at the wireless device 12,18, 20, and 22, and that the first network server can provide access or downloading the requested data or application. The use of the interactive screen server 32 as a second network server allow faster provision of the interactive screen and storage of interaction records, especially with a stored interaction records database 30, than would be possible with all functionality occurring on a single network server, such as application download server 16. The increase in system 10 speed translates to decreased data transfer time across the wireless network 14, which conserves the expensive bandwidth of the wireless network 14.

The interactive screen can be provided to the wireless device 12, 18, 20, and 22 at any interval during the wireless device-network server interaction. The system 10 can transmit the interactive screen to the wireless device to block access to a specific application, a dataset, or even a file level on the network server (data may be held on a network server in a file structure such as in Windows, UNIX, and LINUX). Further, the transmission of the interactive screen can occur at any time an application or data is sought accessed or downloaded by a wireless device, or if a one-time EULA was necessary, a record of the wireless device 12, 18, 20, and 22 execution of the EULA can be stored, for example on stored interaction records database 30. A comparison can be made by a network server, such as the interactive screen server 32, when a wireless device seeks to download an application or data and if the wireless device has a EULA stored, then the interaction screen provision is unnecessary and the system 10 can let the download proceed.

Figure 4:
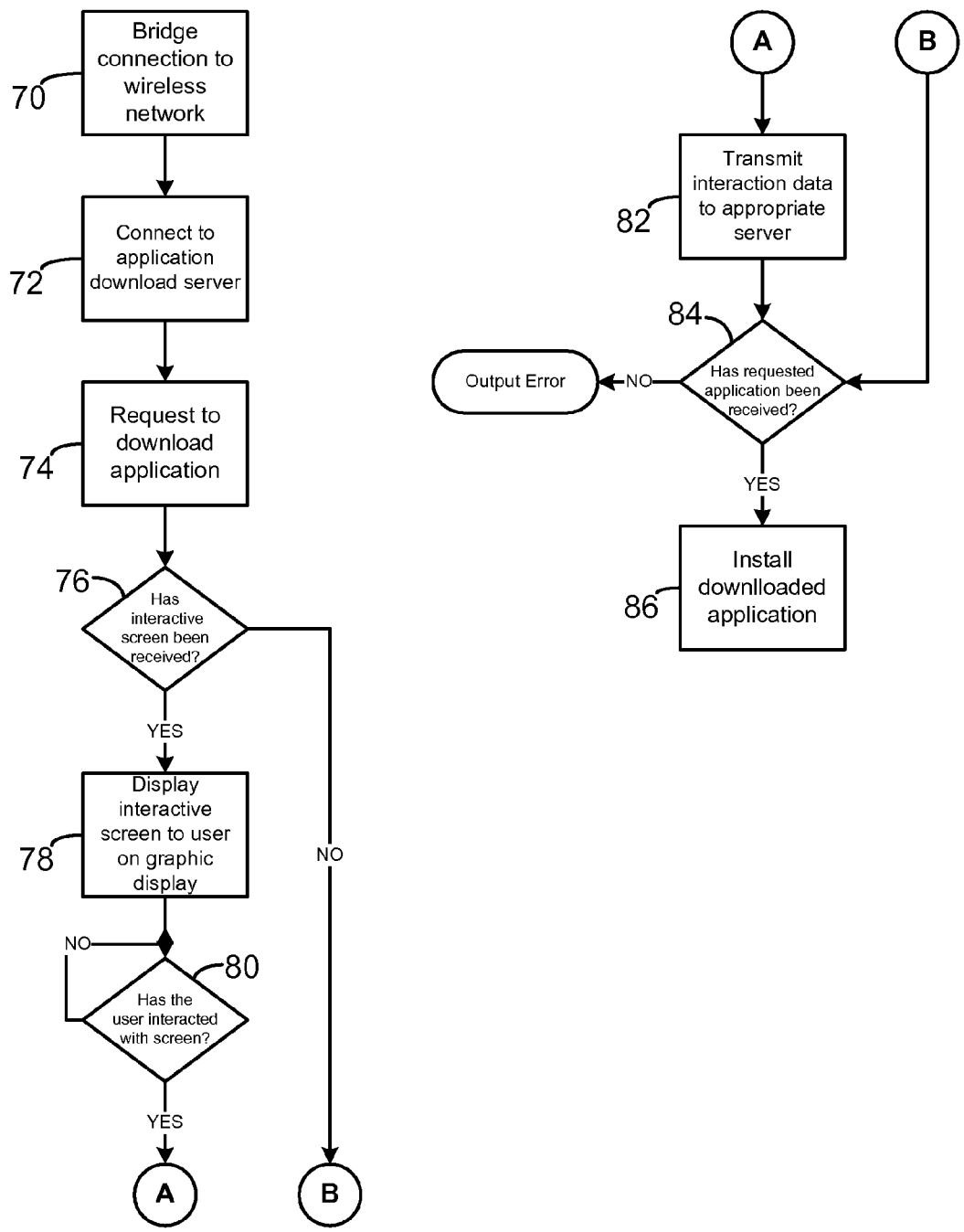
FIG. 4 is a flowchart illustrating the process executing on the wireless device computer platform to attempt to download and application from a network server, and receiving and displaying an interactive screen to the user, transmitting the interaction data to the network server, and downloading the application.

In one exemplary embodiment, the process executed on the computer platform 50 of the wireless device 12, 18, 20, and 22 is shown in the flowchart of FIG. 4. The wireless device, such as cellular telephone 12, bridges a connection to the wireless network 14, as shown at step 72, such as a cellular network, and then connects to a network server, such as application download server 16, as shown at step 72. At some point while connected to the application download server 16, the wireless device will request to download an application, as shown at step 74, or will seek to otherwise access data that has limited access. Thus, after the request is made at step 74, a decision is made as to whether an interactive screen 15 and 17 has been received at the computer platform 50 of the wireless device, as shown by decision 50. If an interactive screen 15 and 17 has not been received, then the process proceeds to determine if the requested application has been received at decision 84. Otherwise, if the interactive screen 15 and 17 has been received at decision 76, the interactive screen 15 and 17 is displayed on the graphic display 13, 19, 21, and 23 of the wireless device 12, 18, 20, and 22 as shown at step 78.

After the interactive screen 15 and 17 is displayed, a decision is made as to whether the user has interacted with the interactive screen 15 and 17, as shown at decision 80, or in other words, the wireless device waits until the user interacts with the interactive screen 15 and 17 so it can send a signal and/or data back to the interactive screen transmitting network server, such as application download server 16 or interactive screen server 32. If the user has not interacted with the interactive screen 15 and 17 at decision 80, the process reenters decision 80 in a wait-state until the user does interact with the interactive screen 15 and 17 or exits the download request. If the user has interacted with the interactive screen 15 and 17 at decision 80, then the interaction data or a signal is transmitted from the wireless device 12, 18, 20, and 22 to the appropriate network server, as shown at step 82.

A decision is then made as to whether the request application has been received at the computer platform 50 of the wireless device 12, 18, 20, and 22 (or that the requested access has been granted), as shown at decision 84. If the application has not been received (or access has not been granted) at decision 84, then the process is terminated as the download (or access) was unsuccessful. If the application was successfully received at decision 84, the application is installed at the wireless device 12, 18, 20, and 22 as shown at step 86. If the request was for access to data or applications on the network server, then the wireless device 12, 18, 20, and 22 will have access to the data or applications.

Figure 5:
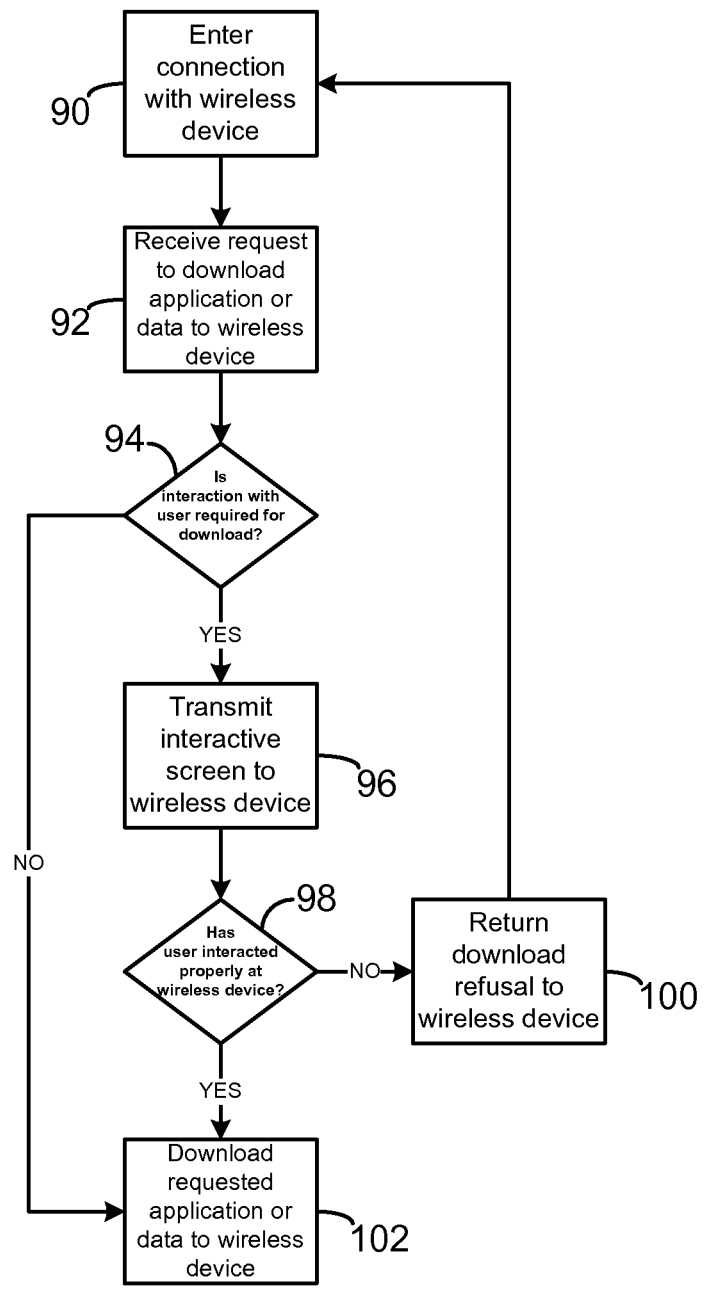
FIG. 5 is a flowchart illustrating the process executing on the application download server receiving a download request from the wireless device in FIG. 4, transmitting an interactive screen to the wireless device, and awaiting the user to properly interact with the interactive screen before allowing the wireless device to download the requested application.

With reference to FIG. 5, an exemplary embodiment of the process executing on the application download server 16 (or other type of network server) is shown in a flowchart. A connection with the wireless device 12, 18, 20, and 22 is entered, as shown at step 90. At some point, the application download server 16 will received a request from the wireless device 12, 18, 20, and 22 to download an application or access resident data, as shown at step 92. Once the request is received at the application download server 16, it is determined if interaction with the wireless device user is required, as shown at decision 94. The determination can be made based upon any criteria that the operator of the network server chooses, such as the owner or the wireless device, the nature of the subject matter of the application or data requested accessed or downloaded. If an interaction with the wireless device user is not required at decision 94, then the requested application is downloaded to the wireless device 12, 18, 20, and 22, as shown at step 102. If interaction is required at decision 94, then an interactive screen 15 and 17 is transmitted to the wireless device 12, 18, 20, and 22, necessitating that the user interact with the interactive screen 15 and 17 before the requested download (or access) is permitted.

A determination is then made as to whether the wireless device user has properly interacted with the interactive screen 15 and 17, such as affirmatively entering a EULA (FIG. 3A) or entering a correct age (FIG. 3B), as shown at decision 98. The interaction signal or data can be sent either directly from the wireless device 12, 18, 20, and 22 requesting the application and displaying the interactive screen 15 and 17, or can be a signal or data sent from a second network server, such as interactive screen server 32 which originally received the interaction signal or data from the wireless device. If the wireless device user has not properly interacted with the interactive screen 15 and 17 at the wireless device 12, 18, 20, and 22, at decision 98, a notice of refusal to download the application to the wireless device 12, 18, 20, and 22 (or denial of access) is returned to the requesting wireless device, as shown at step 100. If the wireless device user has properly interacted with the interactive screen 15 and 17 at the wireless device 12, 18, 20, and 22, at decision 98, then the requested application is downloaded to the wireless device (or access to the requested application granted), as shown at step 102.

The system 10 thus provides a method for displaying an interactive screen 15 and 17 on the graphic display 13, 19, 21, and 23 of a user-interactive wireless device 12, 18, 20, and 22 including attempting to download or access data on a network server, such application download server 16, across the wireless network 14, transmitting a interactive screen 15 and 17 to the computer platform 50 of the wireless device 12, 18, 20, and 22 across the wireless network 14 prior to downloading or accessing the requested data or application, and displaying the interactive screen 15 and 17 on the graphic display 13, 19, 21, and 23 of the wireless device 12, 18, 20, and 22. The method can also include interacting with the interactive screen 15 and 17 at the wireless device 12, 18, 20, and 22, sending a signal to the network server (application download server 16 or interactive screen server 32) from the wireless device 12, 18, 20, and 22 indicating the interaction, and downloading or accessing the requested data or application at the network server with the computer platform 50 of the wireless device 12, 18, 20, and 22. If the interactive screen 15 and 17 allows wireless device user input of data, the method further comprises the steps of inputting data on the interactive screen 15 and 17 displayed on the graphic display 13, 19, 21, and 23 of the wireless device 12, 18, 20, and 22, sending the inputted data from the wireless device 12, 18, 20, and 22 to the network server, processing the input data at the network server, and selectively downloading or granting access to the requested data or application at the network server.

Transmitting an interactive screen 15 and 17 to the wireless device 12, 18, 20, and 22 across the wireless network 14 can include transmitting an interactive screen 15 and 17 to the wireless device 12, 18, 20, and 22 from a first network server (such as application download server 16) that the wireless device requested to download or access and application or data, or can be transmitting an interactive screen 15 and 17 from a second network server (such as an interactive screen server 32) across the wireless network 14. If the interactive screen server 32 is used to provide the interactive screen 15 and 17 to the wireless device, the method can include the steps of interacting with the interactive screen 15 and 17 displayed on the graphic display 13, 19, 21, and 23 of the wireless device, sending a signal from the wireless device to the second network server indicating the interaction, sending a signal from the second network server (such as interactive screen server 32) to the first network server (such as application download server 16) indicating the interaction at the wireless device 12, 18, 20, and 22, and downloading or accessing the requested data or application resident at the first network server to the computer platform 50 of the wireless device 12, 18, 20, and 22. And if the interactive screen 15 and 17 allows wireless device user input of data at the wireless device 12, 18, 20, and 22, the method can further include inputting data on the interactive screen (such as verification form 17 in FIG. 3B) displayed on the graphic display 13, 19, 21, and 23 of the wireless device 12, 18, 20, and 22, sending the input data from the wireless device to the second network server (such as interactive screen server 32), sending a signal from the second network server to the first network server (such as application download server 16) indicating the input of data at the wireless device 12, 18, 20, and 22, and downloading or accessing the requested data or application at the network server to the computer platform 50 of the wireless device 12, 18, 20, and 22.

The invention further includes a wireless device 12, 18, 20, and 22 including a computer platform 50 and a graphic display 13, 19, 21, and 23 thereon, where the wireless device 12, 18, 20, and 22 in selective communication to one or more network servers across a wireless network 14 with each network server selectively downloading data and applications to the wireless device 12, 18, 20, and 22. Upon the wireless device 12, 18, 20, and 22 attempting to download or access data on a network server across the wireless network 14, the computer platform 50 of the wireless device receives an interactive screen 15 and 17 transmitted across the wireless network 14, and the wireless device 12, 18, 20, and 22 displaying the transmitted interactive screen 15 and 17 on the graphic display 13, 19, 21, and 23 thereof. If the interactive screen 15 and 17 allows user input of data at the wireless device 12, 18, 20, and 22, the wireless device then allows the user to input data on the interactive screen 15 and 17 displayed on the graphic display 13, 19, 21, and 23 of the wireless device 12, 18, 20, and 22, and the wireless device sending the inputted data to the appropriate network server (such as application download server 16 and interactive screen server 32).

Another embodiment includes a program resident in a computer readable medium, where the program directs a wireless device having a computer platform to perform the inventive steps of the method. The computer readable medium can be the memory 58 of the computer platform 50 of the cellular telephone 12, or other wireless device, or can be in a local database, such as local database 60 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

In the context of FIGS. 4 and 5, the method may be implemented, for example, by operating portion(s) of the wireless network 14 to execute a sequence of machine-readable instructions, such as wireless platform 50, the application download server 16, and interactive screen server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for processing interactive screens for a wireless device, comprising:
    (a) receiving, from the wireless device, a download request for content;
    (b) determining whether the wireless device has an interactive screen associated with the content;
    (c) if it is determined that the wireless device has the interactive screen associated with the content, transmitting the content to the wireless device without transmitting the interactive screen; and
    (d) if it is determined that the wireless device does not have the interactive screen associated with the content, transmitting the interactive screen to the wireless device before transmitting the content associated with the download request.

2. The method of claim 1, further comprising: after step (d), receiving a signal indicating a satisfactory action of the wireless device upon the interactive screen; and after said receiving, transmitting the content requested by the wireless device.

3. The method of claim 2, wherein said satisfactory action comprises acceptance of a license agreement.

4. The method of claim 2, wherein said satisfactory action comprises supplying information regarding an age of a user of the wireless device.

5. The method of claim 1, wherein said content comprises data.

6. The method of claim 1, wherein said content comprises an application.

7. The method of claim 1, wherein said content and said interactive screen are stored on a same server.

8. The method of claim 1, wherein said content and said interactive screen are stored on different servers.

9. The method of claim 1, wherein said content and said interactive screen are transmitted by a same server.

10. The method of claim 1, wherein said content and said interactive screen are transmitted by different servers.

11. A system for supporting a wireless device, comprising:
    means for receiving, from the wireless device on a wireless network, a download request for content;
    means for determining whether the wireless device has an interactive screen associated with the content; and
    means for transmitting the interactive screen and the content to the wireless device,
    wherein if said means for determining determines that the wireless device has the interactive screen, said means for transmitting transmits the content to the wireless device without transmitting the interactive screen, and
    wherein if said means for determining determines that the wireless device does not have the interactive screen, said means for transmitting transmits the interactive screen to the wireless device before transmitting the content.

12. The system of claim 11, further comprising:
    means for receiving a signal indicating a satisfactory action of the wireless device upon the interactive screen.

13. The system of claim 12, wherein said satisfactory action comprises acceptance of a license agreement.

14. The system of claim 12, wherein said satisfactory action comprises supplying information regarding an age of a user of the wireless device.

15. A computer-readable product, comprising:
    a computer-readable medium, comprising:
        (a) at least one instruction for receiving, from a wireless device, a download request for content;
        (b) at least one instruction for determining whether the wireless device has an interactive screen associated with the content;
        (c) if it is determined that the wireless device has the interactive screen associated with the content, at least one instruction for transmitting the content to the wireless device without transmitting the interactive screen; and
        (d) if it is determined that the wireless device does not have the interactive screen associated with the content, at least one instruction for transmitting the interactive screen to the wireless device before transmitting the content associated with the download request.

16. The computer-readable product of claim 15, further comprising: after step (d),
    at least one instruction for receiving a signal indicating a satisfactory action of the wireless device upon the interactive screen; and
    at least one instruction for transmitting the content requested by the wireless device, after said receiving.

17. The computer-readable product of claim 16, wherein said satisfactory action comprises acceptance of a license agreement.

18. The computer-readable product of claim 16, wherein said satisfactory action comprises supplying information regarding an age of a user of the wireless device.

19. A computer device that controls a presentation of interactive screens for a wireless device desiring to download content across a wireless network, comprising:
  logic that is configured to, upon receipt of a download request for content from the wireless device, determine whether the wireless device has an interactive screen associated with the content;
  the logic further configured to, if it is determined that the wireless device has the interactive screen associated with the content, transmit the requested content to the wireless device without transmitting the interactive screen; and
  the logic further configured to, if it is determined that the wireless device does not have the interactive screen associated with the content, transmit the interactive screen to the wireless device before transmitting the content associated with the download request.

20. The computer device of claim 19, further comprising logic configured to receive a signal indicating a satisfactory action of the wireless device upon the interactive screen; and the logic further configured to, after said receiving, transmit the content requested by the wireless device.

21. The computer device of claim 20, wherein said logic configured to receive the signal indicating the satisfactory action is configured to receive a signal indicating acceptance of a license agreement.

22. The computer device of claim 20, wherein said logic configured to receive the signal indicating the satisfactory action is configured to receive a signal indicating a supplying of information regarding an age of a user of the wireless device.

23. The computer device of claim 19, wherein the computer device further storing the content and the interactive screen requested by the wireless device.

24. The computer device of claim 19, wherein the computer device storing the content and further having logic configured to direct the transmitting of the interactive screen that is stored on another computer device to the wireless device requesting content.

* * * * *